( 12 ) United States Patent
Miyazaki et al.

(10) Patent No.: US 9,374,169 B2
(45) Date of Patent: Jun. 21, 2016

(54) OPTICAL COMMUNICATION FIBER, OPTICAL COMMUNICATION MODULE, AND OPTICAL COMMUNICATION SYSTEM

(71) Applicant: Sony Corporation, Tokyo (JP)

(72) Inventors: Hirohito Miyazaki, Kanagawa (JP); Kazuyoshi Yamada, Tokyo (JP); Tsuyoshi Ogawa, Kanagawa (JP); Fujio Kanayama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/334,198

(22) Filed: Jul. 17, 2014

(65) Prior Publication Data

US 2015/0030338 A1 Jan. 29, 2015

(30) Foreign Application Priority Data

Jul. 23, 2013 (JP) .................................. 2013-152209

(51) Int. Cl.
| | |
|---|---|
| *G02B 6/00* | (2006.01) |
| *H04B 10/564* | (2013.01) |
| *H04B 10/25* | (2013.01) |
| *G02B 6/42* | (2006.01) |
| *G02B 6/32* | (2006.01) |
| *G02B 6/43* | (2006.01) |
| *G02B 6/26* | (2006.01) |

(52) U.S. Cl.
CPC ............ *H04B 10/564* (2013.01); *G02B 6/4204* (2013.01); *H04B 10/25* (2013.01); *G02B 6/266* (2013.01); *G02B 6/32* (2013.01); *G02B 6/43* (2013.01)

(58) Field of Classification Search
CPC ........ G02B 6/266; G02B 6/3594; G02B 6/32; G02F 2203/48
USPC .......................... 385/15, 27, 31, 33, 123, 140
See application file for complete search history.

(56) References Cited

U.S. PATENT DOCUMENTS

| 4,859,079 | A | * | 8/1989 | Wickersheim et al. ........ 374/131 |
| 6,340,831 | B1 | * | 1/2002 | Kuhara et al. .................. 257/461 |
| 2006/0063973 | A1 | * | 3/2006 | Makower et al. ............. 600/114 |
| 2008/0037024 | A1 | * | 2/2008 | Backman et al. ............. 356/446 |

FOREIGN PATENT DOCUMENTS

| JP | 07-294779 | 11/1995 |
| JP | 11-326689 | 11/1999 |
| JP | 2008-098316 | 4/2008 |

* cited by examiner

*Primary Examiner* — Jennifer Doan
(74) *Attorney, Agent, or Firm* — Dentons US LLP

(57) ABSTRACT

An optical communication fiber includes: a fiber body having a tip surface; and a light absorption layer provided to the tip surface of the fiber body, and configured to reduce light transmittance of communication light.

12 Claims, 12 Drawing Sheets

OPTICAL COMMUNICATION FIBER, OPTICAL COMMUNICATION MODULE, AND OPTICAL COMMUNICATION SYSTEM

CROSS REFERENCE TO RELATED APPLICATIONS

This application claims the benefit of Japanese Priority Patent Application JP 2013-152209 filed Jul. 23, 2013, the entire contents which are incorporated herein by reference.

BACKGROUND

The present disclosure relates to an optical communication fiber, an optical communication module, and an optical communication system that are used for optical communication.

Recently, instead of electrical wiring, optical wiring is increasingly used as an information transmission path with an increase in amount of information handled. As the optical wiring, mainly optical fibers are often used. In this case, for example, an end of the optical fiber is connected to an information processing apparatus through an optical transmission module. The optical transmission module converts an electrical signal output from the information processing apparatus into an optical signal, and then emits light to the optical fiber. A laser with a small optical transmission loss over a long distance is mainly used for light emission. Moreover, an optical reception module is connected to the other end of the optical fiber. The optical reception module converts the optical signal having propagated through the optical fiber into an electrical signal. Since this signal is commonly extremely weak, in many cases, this signal is amplified by an amplifier.

SUMMARY

Recently, with an increase in amount of information handled, a further increase in speed of information communication is strongly desired. For example, in a supercomputer, a data center, and the like, connection with various kinds of apparatuses in various hierarchical levels is necessary. In this case, it is necessary to appropriately control optical power on a transmission side and optical power on a reception side depending on apparatuses. For example, in a case where strong optical power is emitted to an apparatus on the reception side, there is a possibility that the strong optical power breaks an optical reception device. In this case, it is considered to perform control so as to reduce optical output power on the transmission side. However, when optical output power of an optical device such as an LD (Laser Diode) is reduced, necessary high-frequency characteristics for optical communication may not be obtained. Therefore, it is desirable to develop an optical fiber capable of structurally controlling optical output power.

In Japanese Unexamined Patent Application Publication Nos. H7-294779, H11-326689, and 2008-98316, to enhance coupling efficiency with an optical device such as an LD, it has been proposed that a tip section of an optical fiber is formed in a convex lens shape; however, it is difficult to control optical output power simply by forming the tip section of the optical fiber in a convex lens shape.

It is desirable to provide an optical communication fiber, an optical communication module, and an optical communication system that are capable of easily achieving control of optical output power.

According to an embodiment of the present disclosure, there is provided an optical communication fiber including: a fiber body having a tip surface; and a light absorption layer provided to the tip surface of the fiber body, and configured to reduce light transmittance of communication light.

According to an embodiment of the present disclosure, there is provided an optical communication module provided with an optical device and an optical communication fiber having a first end section, the first end section being optically coupled to the optical device, the optical communication fiber including: a fiber body having a tip surface; and a light absorption layer configured to reduce light transmittance of communication light, in which the first end section of the optical communication fiber has a configuration in which the light absorption layer is provided to the tip surface of the fiber body.

According to an embodiment of the present disclosure, there is provided an optical communication system provided with a first optical communication module, a second optical communication module, and an optical communication fiber including a first end section and a second end section, the first end section being optically coupled to the first optical communication module, and the second end section being optically coupled to the second optical communication module, the optical communication fiber including: a fiber body having a tip surface; and a light absorption layer configured to reduce light transmittance of communication light, in which the first end section of the optical communication fiber has a configuration in which the light absorption layer is provided to the end surface of the fiber body.

In the optical communication fiber, the optical communication module, and the optical communication system according to the embodiments of the present disclosure, light transmittance of communication light is reduced by the light absorption layer provided to the tip surface of the fiber body.

In the optical communication fiber, the optical communication module, and the optical communication system according to the embodiments of the present disclosure, the light absorption layer is provided to the tip surface of the fiber body to reduce light transmittance of communication light; therefore, control of optical output power is easily achievable.

It is to be noted that effects of the embodiments of the present disclosure are not necessarily limited to effects described here, and may include any effect described in this description.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the technology, and are incorporated in and constitute a part of this specification. The drawings illustrate embodiments and, together with the specification, serve to explain the principles of the technology.

DETAILED DESCRIPTION

Some embodiments of the present disclosure will be described in detail below referring to the accompanying drawings. It is to be noted that description will be given in the following order.

Figure 1:
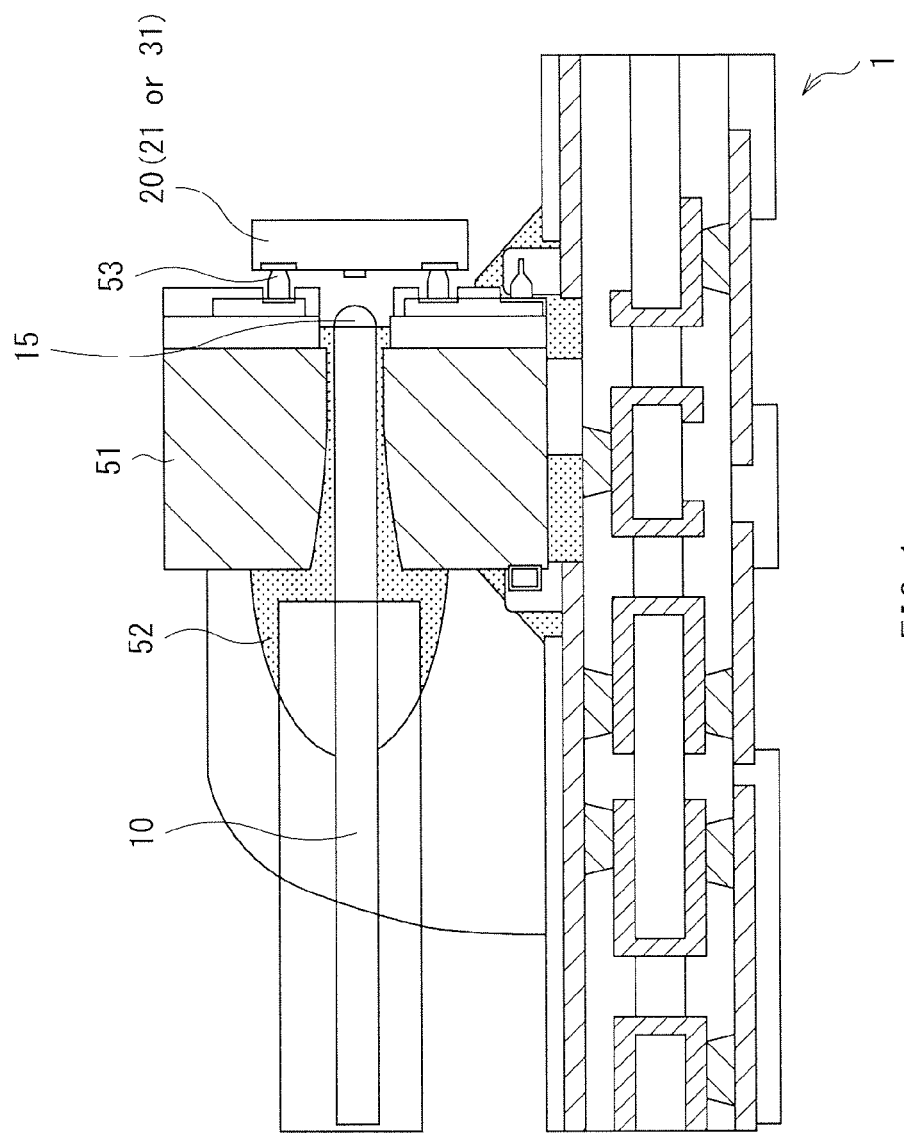
FIG. 1 is a sectional view illustrating a configuration example of a direct coupling type optical communication module according to an embodiment of the present disclosure.
Figure 2:
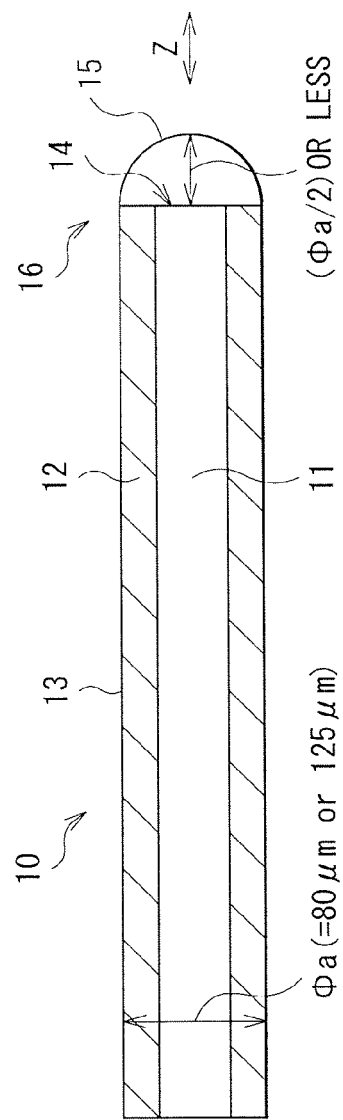
FIG. 2 is a sectional view illustrating a configuration example of an optical communication fiber according to an embodiment.

1. Configuration
1.1 Configuration of Optical Communication Module
1.2 Method of Forming Light Absorption Layer
1.3 Configuration of Optical Communication System
2. Functions
3. Effects
4. Other Embodiments 1. Configuration 1.1 Configuration of Optical Communication Module FIG. 1 illustrates a configuration example of an entire configuration of a direct coupling type optical communication module according to an embodiment of the present disclosure. FIG. 2 illustrates a configuration example of an optical communication fiber 10 in the optical communication module illustrated in FIG. 1.

This optical communication module includes a module substrate 1, an optical device 20, and a silicon interposer 51. The silicon interposer 51 is fixed on the module substrate 1. A first end section 16 of the optical communication fiber 10 is inserted into the silicon interposer 51, and the optical communication fiber 10 is fixed by a sealing member 52 such as a resin. A circuit device such as an LDD (Laser Diode Driver) 22 or a TIA (Trans Impedance Amplifier) 32 illustrated in FIG. 3 that will be described later is configured to be electrically connected to the module substrate 1.

The optical device 20 is an optical output device such as a VCSEL (Vertical Cavity Surface Emitting Laser) 21 or a light reception device such as a PD (Photo Diode) 31 illustrated in FIG. 3 that will be described later. The optical communication fiber 10 faces the optical device 20 so as to allow a tip section (the first end section 16) thereof to be optically coupled to the optical device 20. The optical device 20 is fixed to the silicon interposer 51 with a connection pin 53 in between, and is configured to be electrically connected to the module substrate 1.

As illustrated in FIG. 2, the optical communication fiber 10 includes a fiber body 13 including a core 11 and a cladding 12, and a light absorption layer 15 provided to a tip surface 14 of the fiber body 13. The light absorption layer 15 is configured to reduce light transmittance of communication light. The light absorption layer 15 may preferably have a semicircular convex lens shape.

The light absorption layer 15 may be formed by coating the tip surface 14 of the fiber body 13 with a light absorption material. The light absorption material is a material, for example, carbon or a light-absorbing dye, that absorbs at least light in a wavelength region of communication light. Alternatively, a resin containing a material such as carbon or a light-absorbing dye may be used as the light absorption material. As the fiber body 13, typically, a fiber with a diameter $\Phi a$ of 80 μm or 125 μm is often used. The light absorption layer 15 may preferably have a thickness equal to half or less of the diameter $\Phi a$ of the fiber body 13.

1.2 Method of Forming Light Absorption Layer 15

As described above, the light absorption layer 15 may be formed by coating the tip surface 14 of the fiber body 13 with the resin containing the material such as carbon or a light-absorbing dye. In a case where the resin containing the material such as carbon or the light-absorbing dye is used, it is extremely easy to control light transmittance by the content of the material. Moreover, viscosity of the resin is easily adjusted to viscosity suitable for a coating method. As the coating method, for example, a dispenser method or an electrostatic coating method may be used. Since an amount of the resin that is to be applied is extremely small, i.e., on the order of nl (nanoliters), the electrostatic coating method will be described below.

In the electrostatic coating method, a spray nozzle is provided to a container containing a liquid material, and a voltage is applied between the spray nozzle and a target that is to be coated to draw out the liquid material in a small droplet form from an end of the spray nozzle by electrostatic force. In the electrostatic coating method, a particle size of the liquid material sprayed from an extremely thin nozzle is reduced with use of electrostatic force; therefore, a thin film is allowed to be formed. A diameter of the nozzle or a value of the applied voltage may be changed depending on a coating amount or properties of the material used for coating.

The fiber body 13 of the optical communication fiber 10 may be made of, for example, quartz glass. When droplets of the material (the light absorption material) that is to be applied is electrically charged by the electrostatic coating method, the tip surface 14 of the fiber body 13 is allowed to be coated with the light absorption material with a highly precise thickness. Moreover, in a case where an excess of the light absorption material is applied, when a reverse voltage is applied, control is allowed to be performed to reduce a film thickness. Further, the applied light absorption material may be formed in a convex lens shape by surface tension of the light absorption material. It is desirable to coat the tip surface 14 of the fiber body 13 with the light absorption material with a thickness equal to half or less of the diameter $\Phi a$ of the fiber body 13. Doing so allows the light absorption material to be easily formed in the convex lens shape.

In control of optical absorptance (control of light transmittance), variation in optical absorptance is allowed to be reduced by roughly adjusting the optical absorptance by the light absorption material, and then controlling the optical absorptance by a thickness of the applied light absorption material.

1.3 Configuration of Optical Communication System

The optical communication fiber 10 and the optical communication module according to this embodiment may be used for, for example, communication between a camera and a recorder or data communication in a data center.

Figure 3:
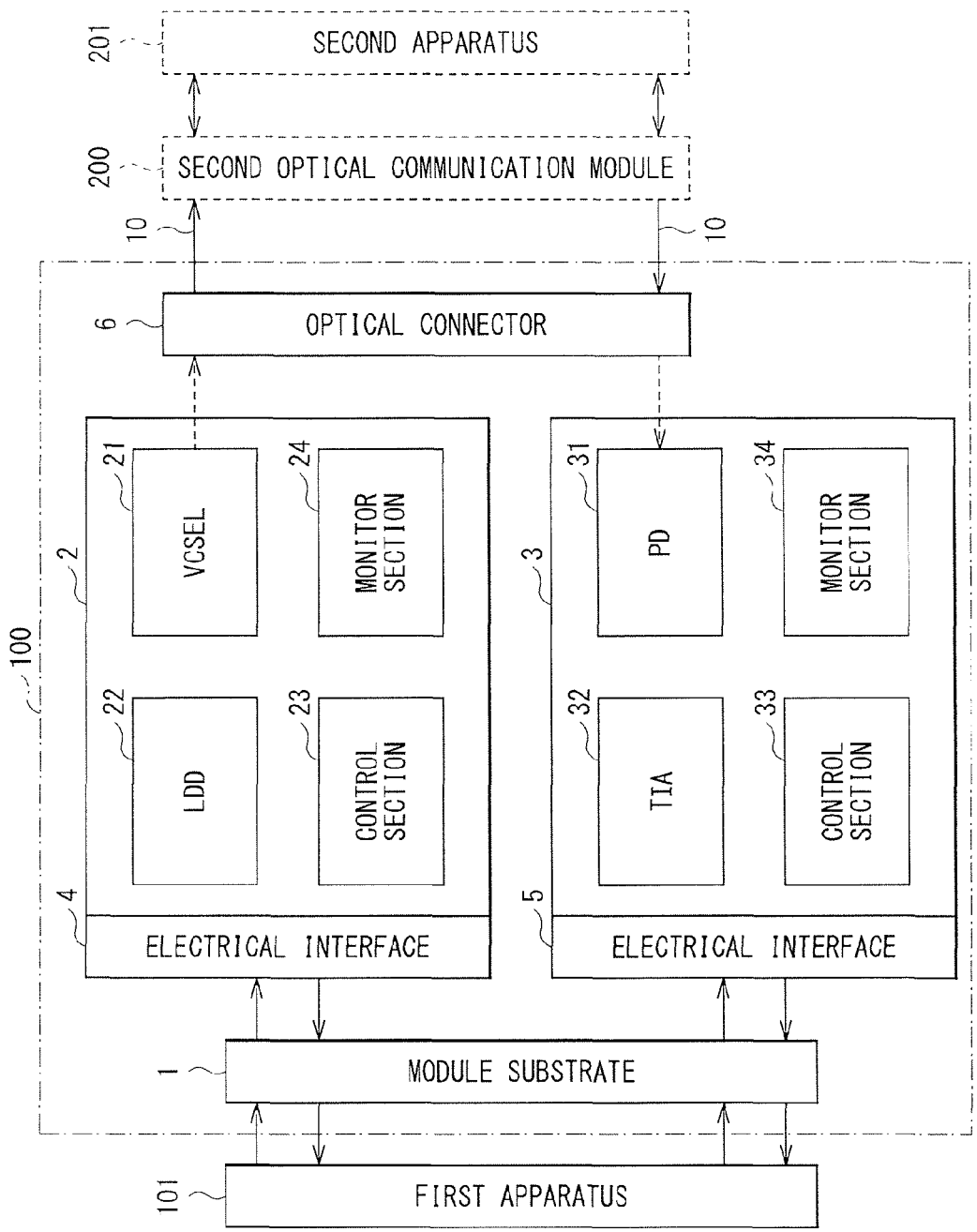
FIG. 3 is a block diagram illustrating a configuration example of an optical communication system according to an embodiment.

FIG. 3 illustrates a configuration example of an optical communication system according to an embodiment of the present disclosure. The optical communication system includes a first optical communication module 100 and a second optical communication module 200. The first optical communication module 100 and the second optical communication module 200 are connected to each other through the optical communication fiber 10. For example, the first end section 16 of the optical communication fiber 10 may be optically coupled to the first optical communication module 100, and a second end section of the optical communication fiber 10 may be optically coupled to the second optical communication module 200. The first optical communication module 100 is connected to a first apparatus 101, and is allowed to transmit and receive data to and from the first apparatus 101. The second optical communication module 200 is connected to a second apparatus 201, and is allowed to transmit and receive data to and from the second apparatus 201.

The first optical communication module 100 includes a module substrate 1, a transmission section 2, a reception section 3, an electrical interface 4, an electrical interface 5, and an optical connector 6. The second optical communication module 200 may have similar components to those of the first optical communication module 100.

The transmission section 2 is configured to be electrically connected to the module substrate 1 through the electrical interface 4. The transmission section 2 includes a VCSEL 21, an LDD 22, a control section 23, and a monitor section 24. The VCSEL 21 is configured to output communication light for optical communication. The VCSEL 21 is optically coupled to the optical communication fiber 10 through the optical connector 6. The monitor section 24 is configured to monitor light output from the VCSEL 21. The LDD 22 is configured to drive the VCSEL 21. The control section 23 is configured to control respective components of the transmission section 2.

The reception section 3 is configured to be electrically connected to the module substrate 1 through the electrical interface 5. The reception section 3 includes a PD 31, a TIA 32, a control section 33, and a monitor section 34. The PD 31 is configured to receive communication light, convert the communication light into an electrical signal, and output the electrical signal. The PD 31 is optically coupled to the optical communication fiber 10 through the optical connector 6. The monitor section 34 is configured to monitor light received by the PD 31. The TIA 32 is configured to amplify an electrical signal output from the PD 31. The control section 33 is configured to control respective components of the reception section 3.

2. Functions

Figure 16:
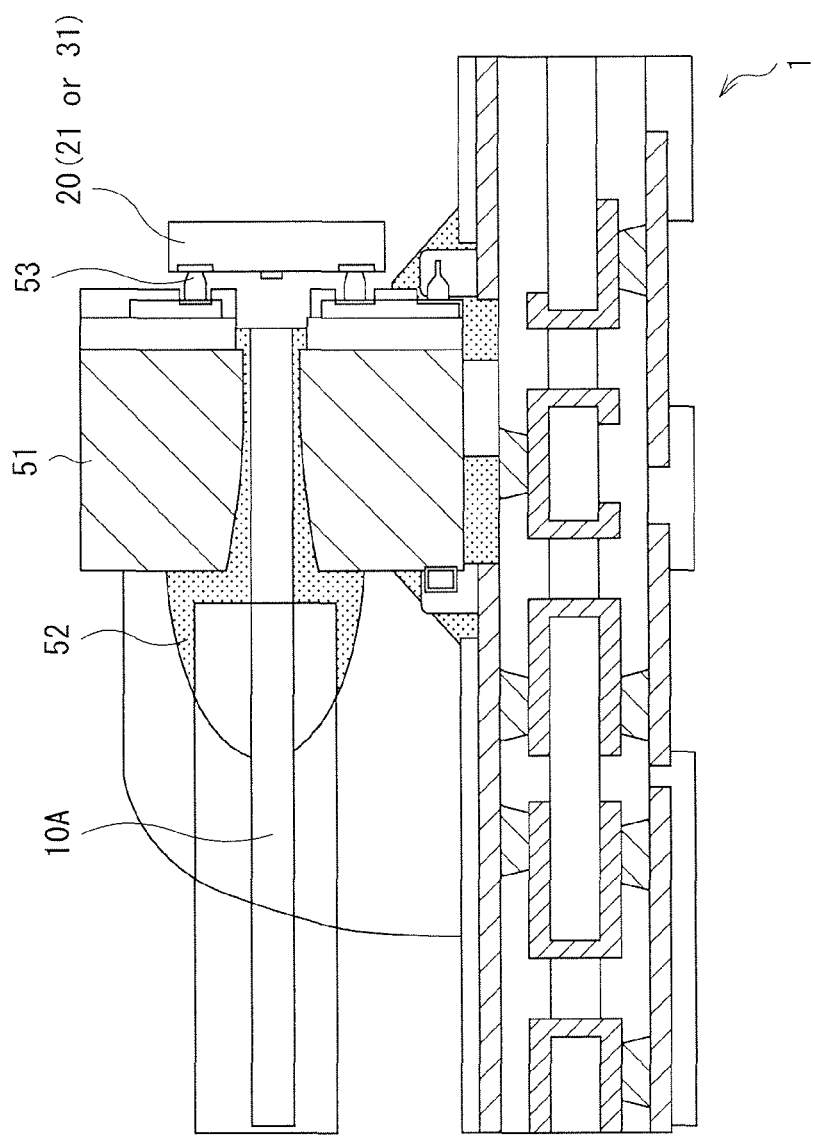
FIG. 16 is a sectional view illustrating a configuration example of a direct coupling type optical communication module in a case where the light absorption layer is not provided to an optical communication fiber.
Figure 17:
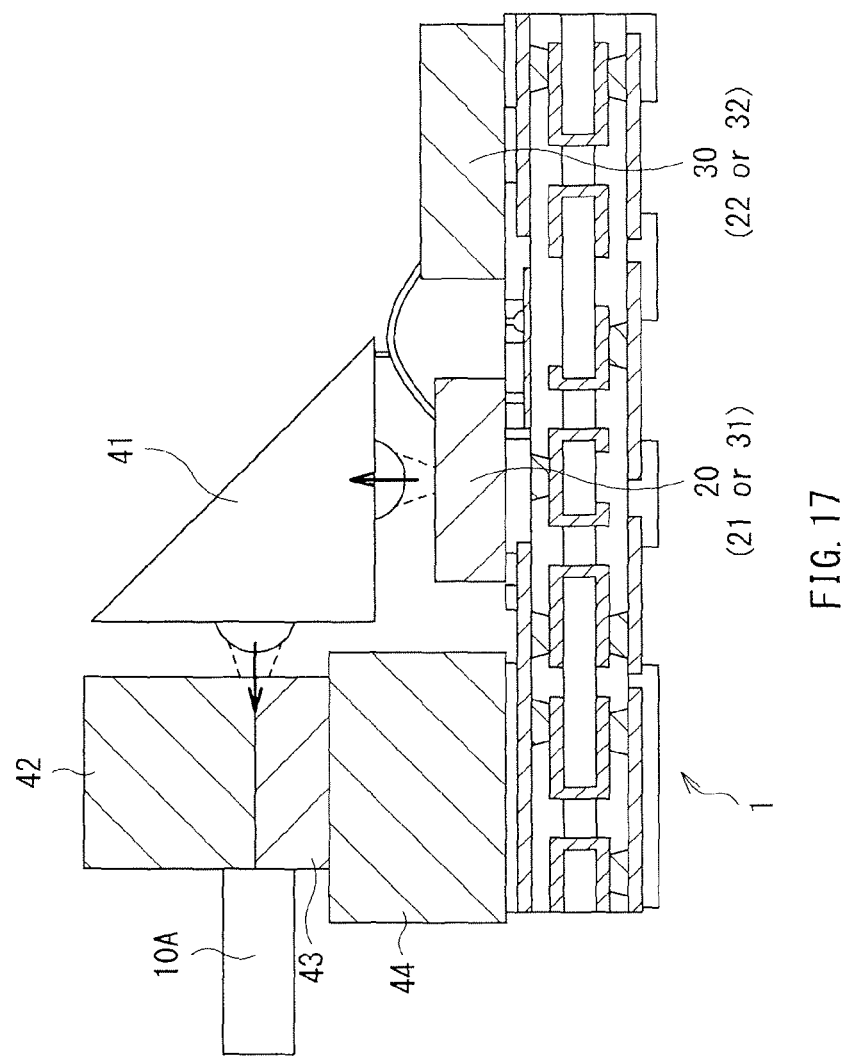
FIG. 17 is a sectional view illustrating a configuration example of a lens coupling type optical communication module.

Functions of the optical communication fiber 10 and the optical communication module according to this embodiment will be described below referring to optical communication modules illustrated in FIGS. 16 and 17 as comparative examples. As with the optical communication module according to this embodiment, the optical communication module illustrated in FIG. 16 is a direct coupling type optical communication module. The optical communication module illustrated in FIG. 17 is a lens coupling type optical communication module. Each of the optical communication modules illustrated in FIGS. 16 and 17 includes an optical communication fiber 10A that does not include the light absorption layer 15, instead of the optical communication fiber 10 including the light absorption layer 15 on the tip section thereof.

The optical communication module illustrated in FIG. 17 includes a 45° mirror lens array 41, a fixing component 42, a fixing component 43, and a fixing component 44. The fixing component 42, the fixing component 43, and the fixing component 44 are fixed to the module substrate 1. A first end section of the optical communication fiber 10A is inserted and fixed between the fixing component 42 and the fixing component 43. The optical device 20 and a circuit device 30 are disposed on the module substrate 1. The module substrate 1, the optical device 20, and the circuit device 30 are configured to be electrically connected to one another. The circuit device 30 may be the LDD 22, the TIA 32, or the like as illustrated in FIG. 3. The optical device 20 is an optical output device such as the VCSEL 21 or a light reception device such as the PD 31 as illustrated in FIG. 3. The optical communication fiber 10A and the optical device 20 are optically coupled to each other through the 45° mirror lens array 41.

In the lens coupling type optical communication module as illustrated in FIG. 17, for example, optical output power may be reduced by providing light absorption characteristics to a lens of the 45° mirror lens array 41. However, use of a lens component causes an increase in the number of components, thereby causing an increase in cost. Moreover, when the number of components is increased, precise alignment of respective components is necessary, thereby complicating manufacturing processes.

Therefore, as illustrated in FIG. 16, the direct coupling type optical communication module without use of lens component is considered. However, since the optical device 20 and the optical communication fiber 10A are directly coupled to each other, unlike the lens coupling type optical communication module, it is difficult to provide light absorption characteristics to the lens component; therefore, it is difficult to reduce optical output power. In this case, when optical output power of the optical device 20 itself is weakened, necessary high-frequency characteristics for optical communication may not be obtained. Moreover, there is an influence of the return light L2 from the tip surface 14 of the optical communication fiber 10A.

Figure 6:
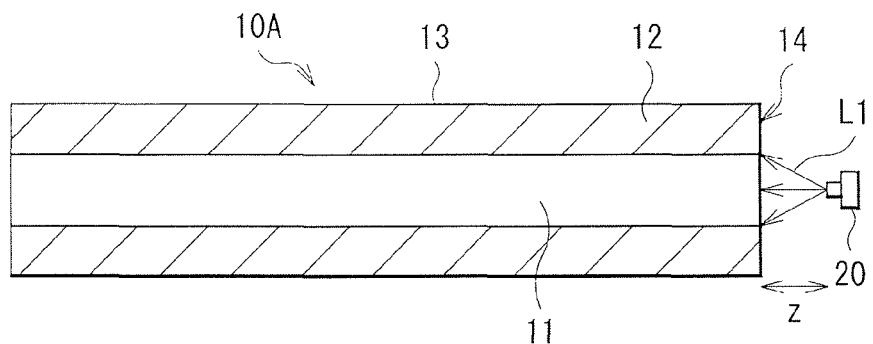
FIG. 6 is an explanatory diagram illustrating an example of incident light on the tip surface of the optical communication fiber in a case where the light absorption layer is not provided to the tip surface of the optical communication fiber.
Figure 7:
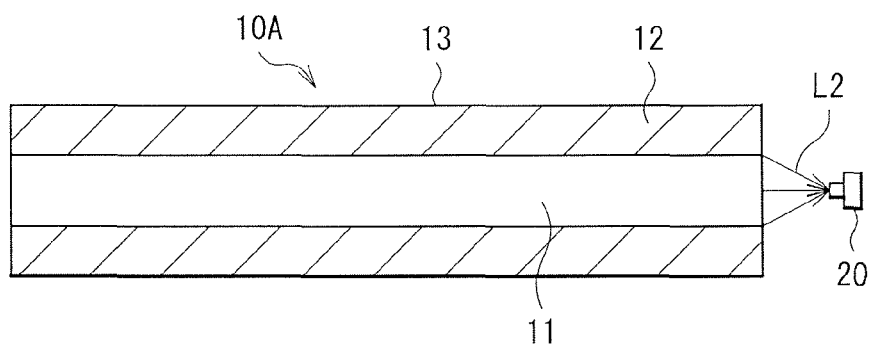
FIG. 7 is an explanatory diagram illustrating an example of return light from the tip surface of the optical communication fiber in the case where the light absorption layer is not provided to the tip surface of the optical communication fiber.
Figure 8:
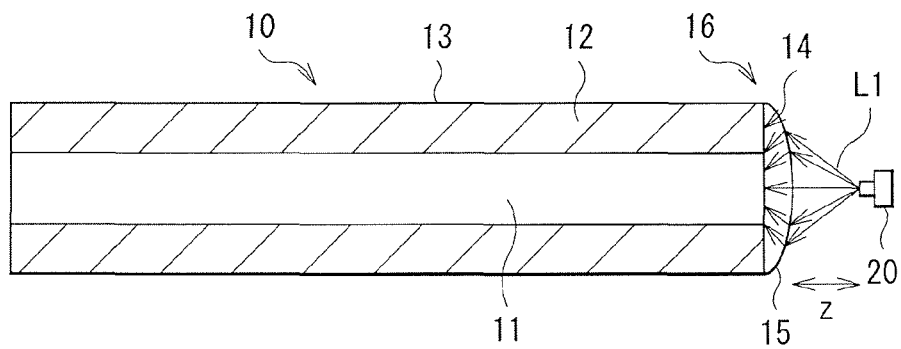
FIG. 8 is an explanatory diagram illustrating an example of incident light on the tip surface of the optical communication fiber in the case where the light absorption layer is provided to the tip surface of the optical communication fiber.
Figure 9:
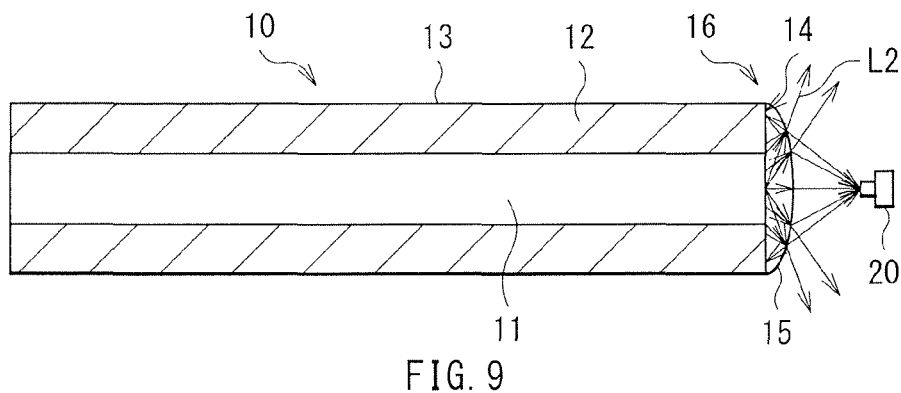
FIG. 9 is an explanatory diagram illustrating an example of return light from the tip surface of the optical communication fiber in the case where the light absorption layer is provided to the tip surface of the optical communication fiber.

FIG. 6 illustrates an example of incident light L1 incident on the tip surface 14 of the optical communication fiber 10A from the optical device 20 in the direct coupling type optical communication module illustrated in FIG. 16. FIG. 7 illustrates an example of the return light L2 from the tip surface 14 of the optical fiber 10A in the same optical communication module. On the other hand, FIG. 8 illustrates an example of the incident light L1 incident on the tip surface 14 of the optical communication fiber 10 from the optical device 20 in the optical communication module according to this embodiment. FIG. 9 illustrates an example of the return light L2 from the tip surface 14 of the optical fiber 10 in the optical communication module according to this embodiment.

Figure 4:
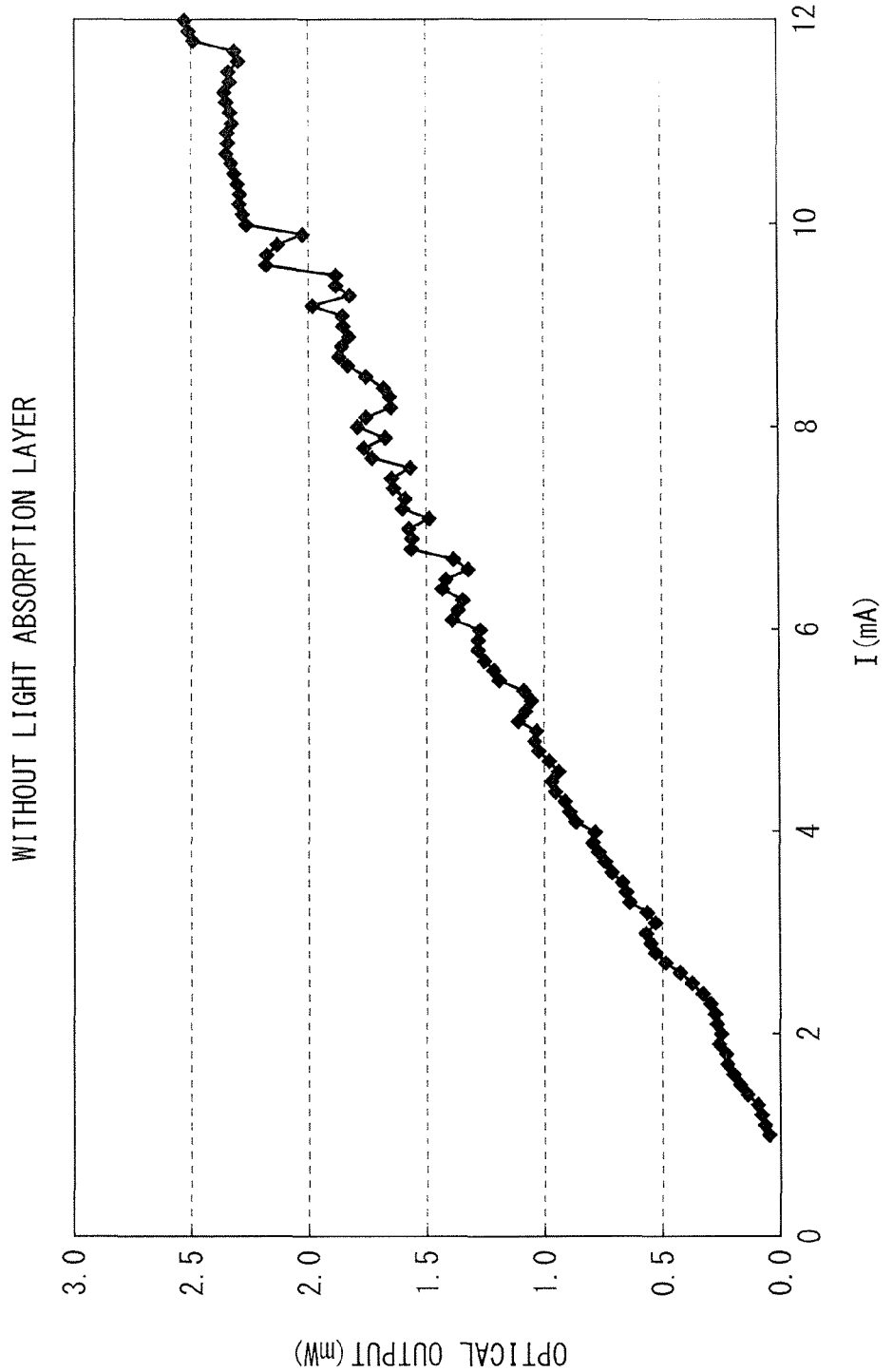
FIG. 4 is a characteristic diagram illustrating an example of a relationship between drive current and optical output of an optical communication module in a case where a light absorption layer is not provided to a tip surface of an optical communication fiber.

In the optical communication module illustrated in FIG. 16, the return light L2 from the tip surface 14 of the optical communication fiber 10A is allowed to be reduced by increasing a distance Z between the optical device 20 and the optical communication fiber 10A; however, a loss caused by coupling is increased. Moreover, when the distance Z between the optical device 20 and the optical communication fiber 10A is decreased to reduce the loss caused by coupling, as illustrated in FIG. 4, optical output power fluctuates by the influence of the return light L2. FIG. 4 illustrates an example of a relationship between drive current (horizontal axis) and optical output (vertical axis) in the direct coupling type optical communication module illustrated in FIG. 16. FIG. 4 illustrates results obtained by measuring an optical output value while changing a current value of the drive current by 0.1 mA.

Therefore, in this embodiment, as illustrated in FIG. 2, when the light absorption layer 15 with a convex lens shape is provided to the tip surface 14 of the fiber body 13, optical output power is allowed to be controlled while reducing the influence of the return light L2 from the tip surface 14 to reduce the loss.

The light transmittance is allowed to be controlled by providing the light absorption layer 15 that absorbs light in a wavelength region of communication light to the tip surface 14 of the fiber body 13 and controlling the content of the light absorption material. Accordingly, optical output power is allowed to be controlled.

Merits in controlling optical output power by the light absorption layer 15 will be described below. For example, in a supercomputer, a data center, and the like, connection with various kinds of apparatuses in various hierarchical levels is necessary. In this case, it is necessary to control optical power on a transmission side and optical power on a reception side depending on apparatuses. For example, in a case where strong optical power is emitted to an apparatus on the reception side, there is a possibility that the strong optical power breaks an optical reception device. For example, in IEEE Std. 802.3ae 10GBASE-SR, in Class 1, 0.2<Pw<0.78 mw (−5 to 75° C.) is stipulated.

Optical output power is determined by characteristics of the optical output device, and it is difficult to finely control optical output power. Optical output power is allowed to be reduced by decreasing the drive current of the optical output device; however, when the drive current is decreased, it is difficult to pass a high-frequency waveform 10GBASE-R eye mask. Therefore, a characteristic that a high-frequency waveform 10GBASE-R eye mask margin is maintained is allowed to be obtained by providing the light absorption layer 15 to simply attenuate communication light without decreasing the drive current.

Moreover, when the light absorption layer 15 is formed in a convex lens shape, in addition to control of light transmittance, an effect associated therewith is allowed to be obtained. The associated effect will be described below.

First, in a case where the light absorption layer 15 with a convex lens shape as illustrated in FIG. 2 is not provided, when the distance Z between the optical device 20 and the optical communication fiber 10A is decreased to reduce the loss caused by coupling, as illustrated in FIG. 4, a phenomenon that optical output power fluctuates by the influence of the return light L2 occurs.

Figure 5:
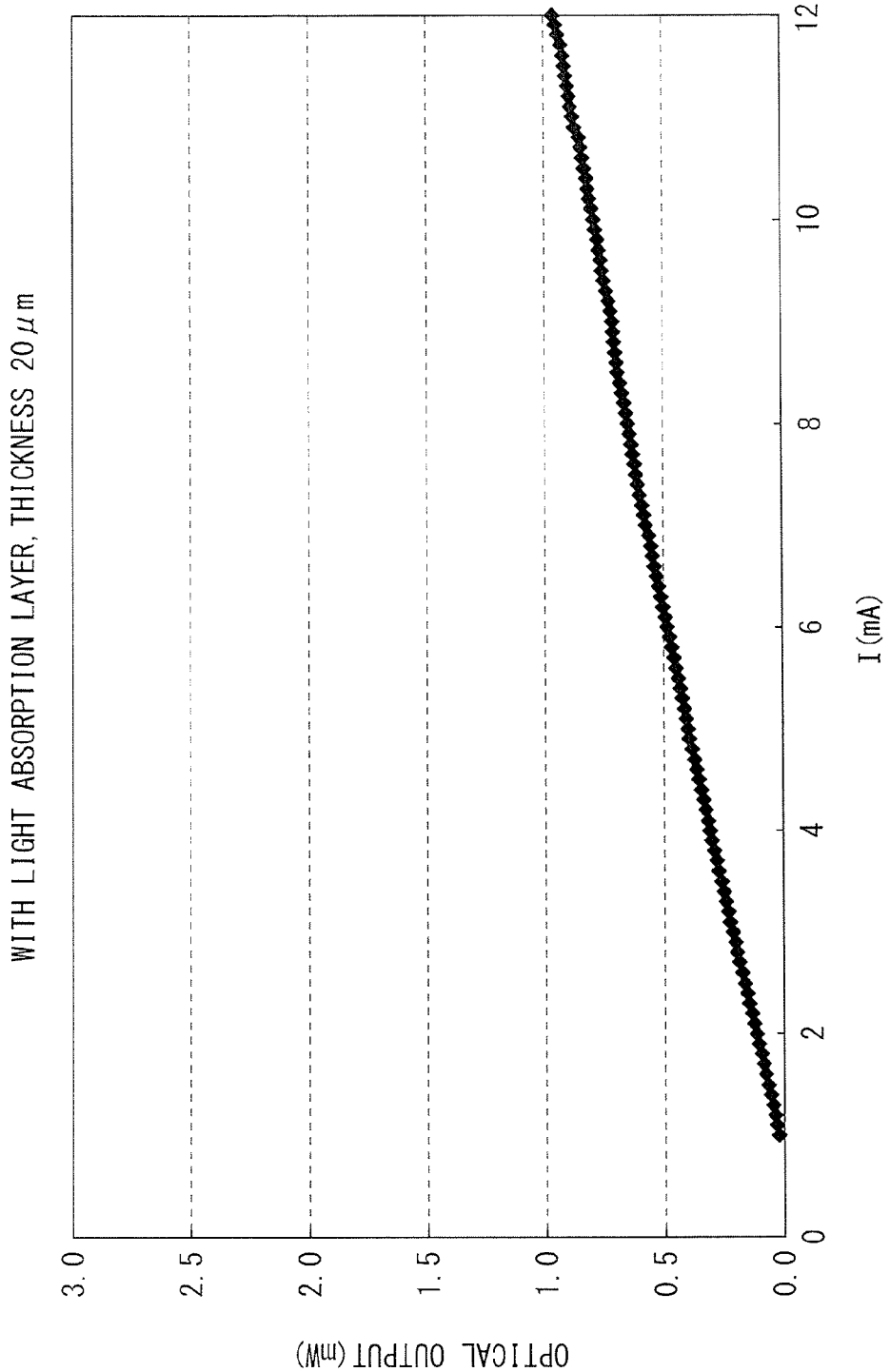
FIG. 5 is a characteristic diagram illustrating an example of a relationship between drive current and optical output of an optical communication module in a case where a light absorption layer is provided to a tip surface of an optical communication fiber.

However, when the light absorption layer 15 with a convex lens shape as illustrated in FIG. 2 is formed with a thickness of about 20 μm by coating, as illustrated in FIG. 5, fluctuation of optical power caused by the influence of the return light L2 is hardly observed. It is considered that, as illustrated in FIG. 9, the influence of the return light L2 is reduced by the convex lens shape. It is to be noted that FIG. 5 illustrates an example of a relationship between drive current (horizontal axis) and optical output (vertical axis) in the optical communication module according to this embodiment. As with FIG. 4, FIG. 5 illustrates results obtained by measuring an optical output value by changing a current value of the drive current by 0.1 mA.

Figure 10:
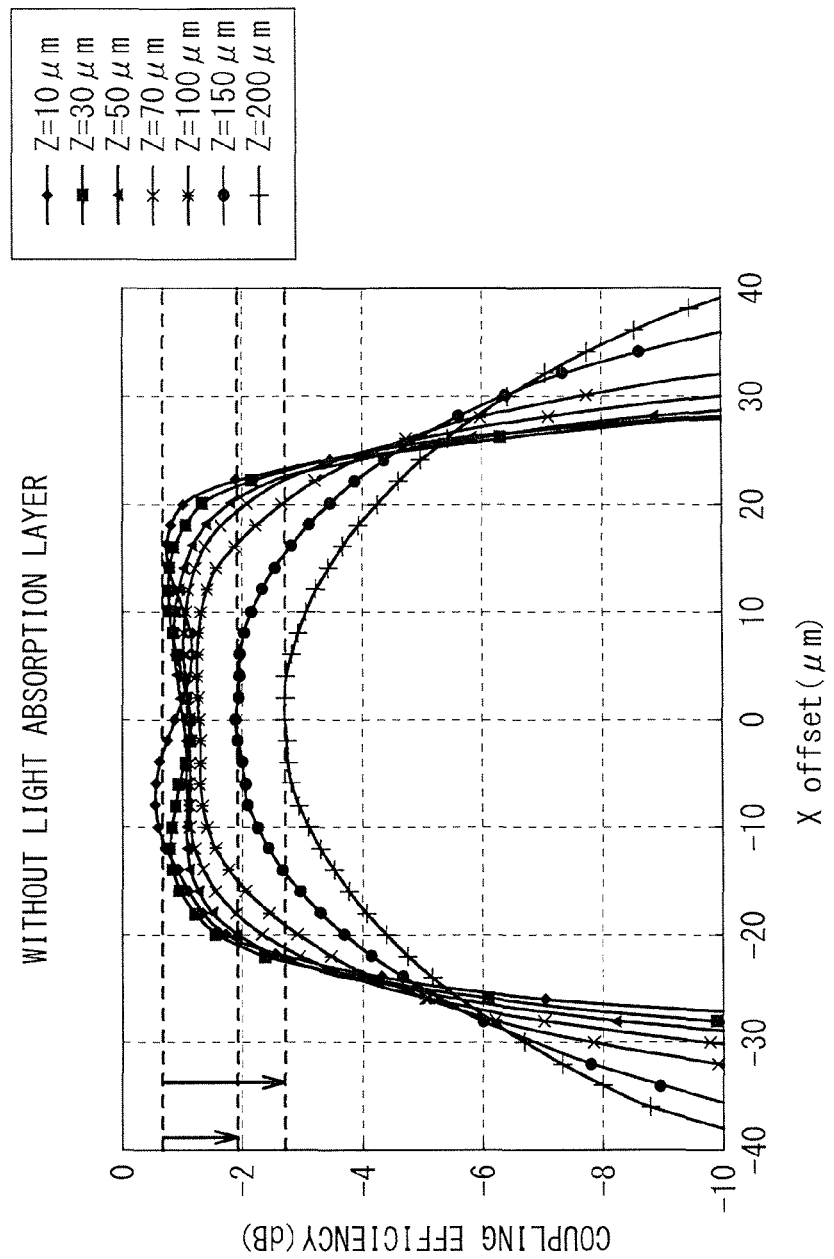
FIG. 10 is a characteristic diagram illustrating an example of characteristics of coupling efficiency between the optical communication fiber and an optical device in the case where the light absorption layer is not provided to the tip surface of the optical communication fiber.
Figure 11:
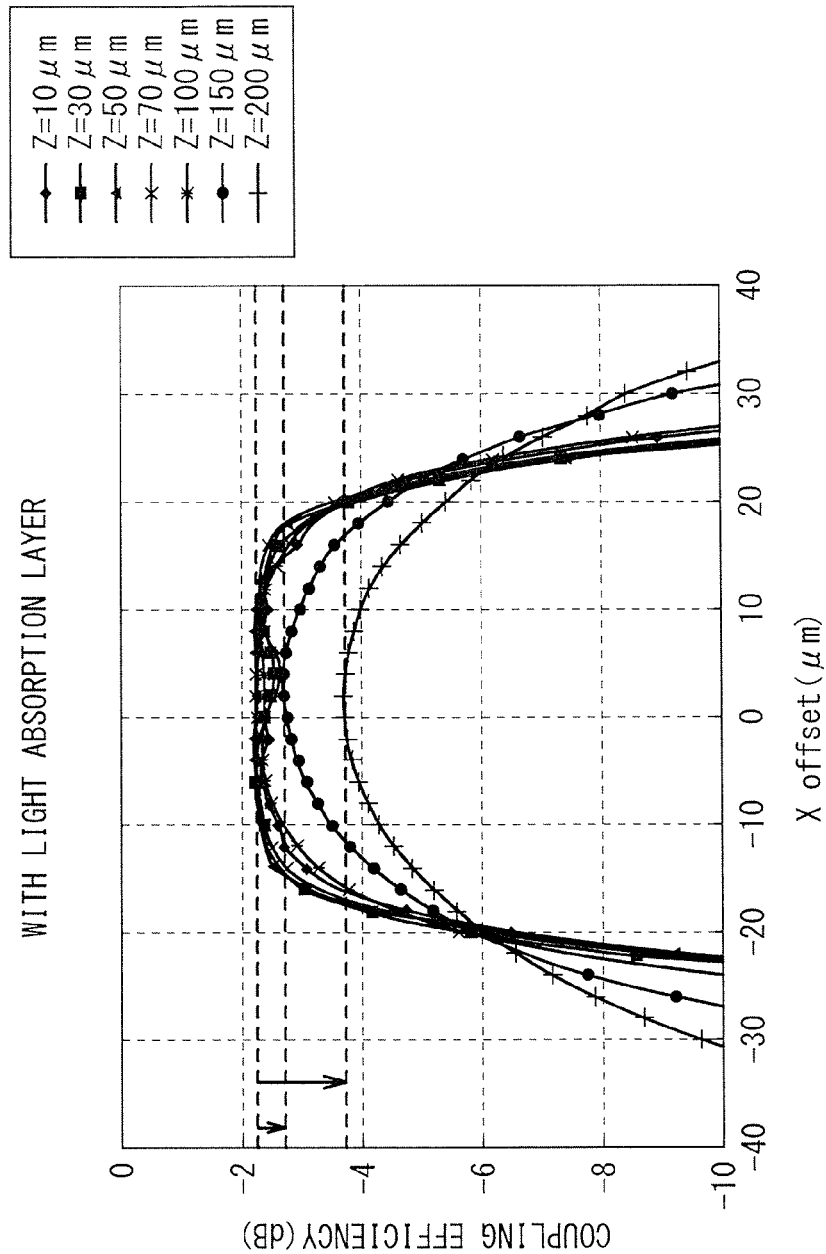
FIG. 11 is a characteristic diagram illustrating an example of characteristics of coupling efficiency between the optical communication fiber and the optical device in the case where the light absorption layer is provided to the tip surface of the optical communication fiber.

Moreover, as a result of performing coupling evaluation, as illustrated in FIGS. 10 and 11, it turns out that, when the light absorption layer 15 is provided, even in a case where tolerance (the distance Z) in a direction perpendicular to the tip surface 14 is increased, a configuration according to this embodiment has a smaller loss of coupling efficiency. It is considered that the tolerance in the direction perpendicular to the tip surface 14 is substantially increased by a lens effect of the light absorption layer 15. It is to be noted that FIG. 10 illustrates an example of characteristics of coupling efficiency between the optical communication fiber 10A and the optical device 20 in the direct coupling type optical communication module illustrated in FIG. 16. FIG. 11 illustrates an example of characteristics of coupling efficiency between the optical communication fiber 10 and the optical device 20 in the optical communication module according to this embodiment. In FIGS. 10 and 11, a horizontal axis indicates an offset amount in a direction parallel to the tip surface 14 of the fiber, and a vertical axis indicates coupling efficiency.

Figure 12:
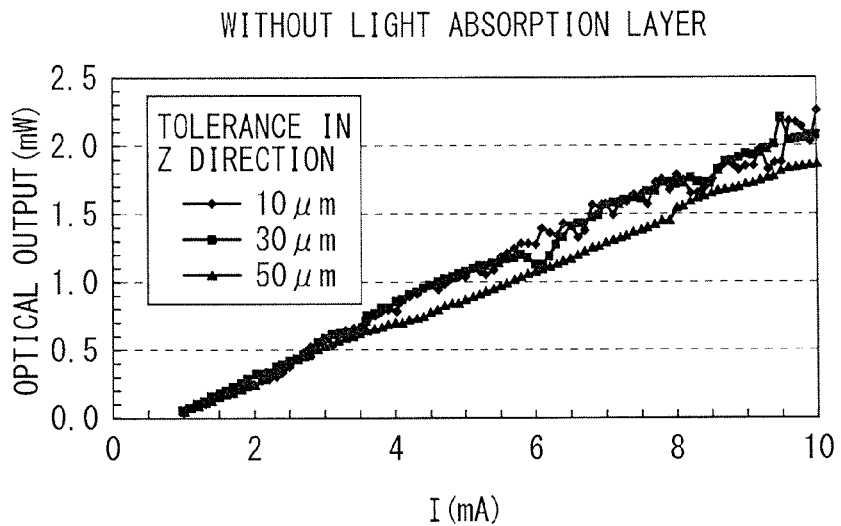
FIG. 12 is a characteristic diagram illustrating an example of a relationship between drive current and optical output of the optical communication module in the case where the light absorption layer is not provided to the tip surface of the optical communication fiber.
Figure 13:
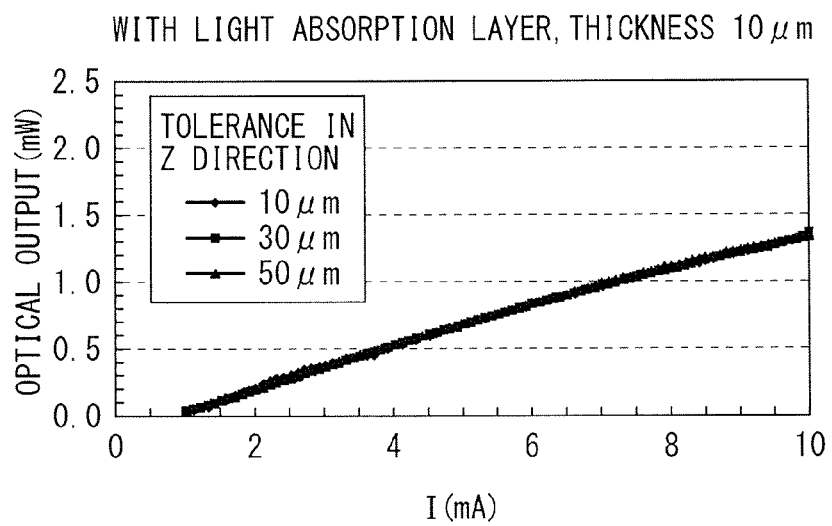
FIG. 13 is a characteristic diagram illustrating an example of a relationship between drive current and optical output of the optical communication module in a case where a light absorption layer with a thickness of 10 μm is provided to the tip surface of the optical communication fiber.
Figure 14:
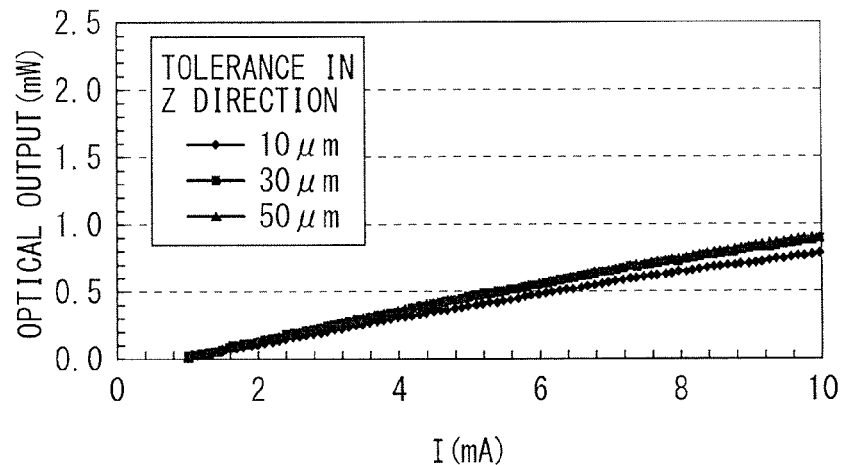
FIG. 14 is a characteristic diagram illustrating an example of a relationship between drive current and optical output of the optical communication module in a case where a light absorption layer with a thickness of 20 μm is provided to the tip surface of the optical communication fiber.
Figure 15:
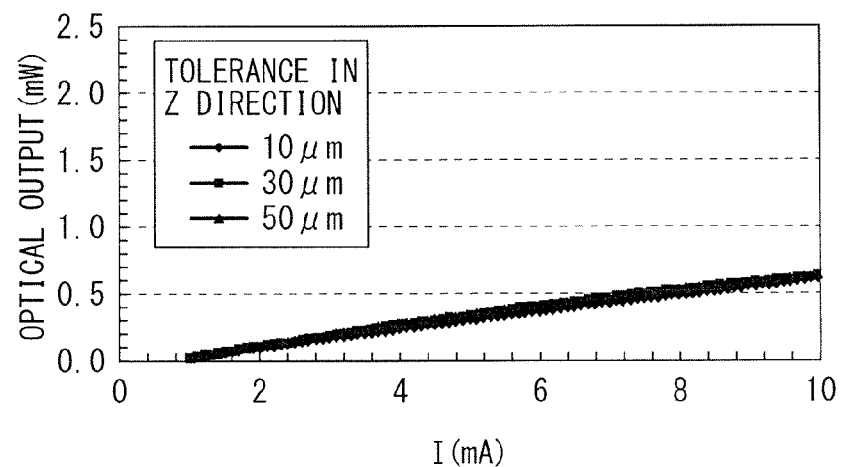
FIG. 15 is a characteristic diagram illustrating an example of a relationship between drive current and optical output of the optical communication module in a case where a light absorption layer with a thickness of 30 μm is provided to the tip surface of the optical communication fiber.

FIGS. 12 to 15 illustrate a difference in characteristics of optical output caused by a difference in thickness of the light absorption layer 15 provided to the tip surface 14 of the optical communication fiber 10. FIG. 12 illustrates characteristics in a case where the light absorption layer 15 is not provided (the light absorption layer 15 has a thickness of zero), FIG. 13 illustrates characteristics in a case where the light absorption layer 15 has a thickness of 10 μm, FIG. 14 illustrates characteristics in a case where the light absorption layer 15 has a thickness of 20 μm, and FIG. 15 illustrates characteristics in a case where the light absorption layer 15 has a thickness of 30 μm. In FIGS. 12 to 15, a horizontal axis indicates drive current, and a vertical axis indicates optical output. Each of FIGS. 12 to 15 illustrates optical output values when the tolerance (distance Z) in the direction perpendicular to the tip surface 14 is 10 μm, 20 μm, and 30 μm.

As can be seen from the characteristics in FIGS. 12 to 15, light transmittance is allowed to be controlled by changing the thickness of the light absorption layer 15. Accordingly, optical output power is allowed to be controlled.

3. Effects

As described above, in this embodiment, the light absorption layer 15 is provided to the tip surface 14 of the fiber body 13 to reduce light transmittance of communication light; therefore, control of optical output power is easily achievable. When the optical communication fiber 10 according to this embodiment is used, in an apparatus using the optical communication fiber 10, downsizing and higher density are achievable while reducing a loss. Moreover, in a typical direct coupling type optical communication module (refer to FIG. 16), when the distance Z between the optical communication fiber 10A and the optical device 20 is decreased to reduce a loss caused by coupling, concerns about the return light L2 are created; however, the influence of the return light L2 is allowed to be largely reduced by the present technology. Further, by the present technology, an effect that the loss of coupling efficiency is small even in a case where the tolerance (the distance Z) in the direction perpendicular to the tip surface 14 of the optical communication fiber 10 is increased is obtainable.

It is to be noted that the effects described in this description are merely examples; therefore, effects in this embodiment is not limited thereto, and this embodiment may have other effects.

4. Other Embodiments

The technology of the present disclosure is not limited to the above-described embodiments, and may be variously modified.

For example, the present technology is applicable not only to the direct coupling type optical communication module but also to a lens coupling type optical communication module as illustrated in FIG. 17.

It is to be noted that the present technology may have the following configurations.

(1) An optical communication fiber including:
a fiber body having a tip surface; and
a light absorption layer provided to the tip surface of the fiber body, and configured to reduce light transmittance of communication light.

(2) The optical communication fiber according to (1), in which the light absorption layer has a convex lens shape.

(3) The optical communication fiber according to (1) or (2), in which the light absorption layer has a thickness equal to half or less of a diameter of the fiber body.

(4) The optical communication fiber according to any one of (1) to (3), in which the light absorption layer is formed by coating the tip surface of the fiber body with a light absorption material.

(5) An optical communication module provided with an optical device and an optical communication fiber having a first end section, the first end section being optically coupled to the optical device, the optical communication fiber including:
a fiber body having a tip surface; and
a light absorption layer configured to reduce light transmittance of communication light,
in which the first end section of the optical communication fiber has a configuration in which the light absorption layer is provided to the tip surface of the fiber body.

(6) The optical communication module according to (5), in which the optical device and the first end section of the optical communication fiber are coupled to each other by an optical direct coupling system.

(7) The optical communication module according to (5) or (6), in which the optical device is a device configured to output light.

(8) An optical communication system provided with a first optical communication module, a second optical communication module, and an optical communication fiber including a first end section and a second end section, the first end section being optically coupled to the first optical communication module, and the second end section being optically coupled to the second optical communication module, the optical communication fiber including:
a fiber body having a tip surface; and
a light absorption layer configured to reduce light transmittance of communication light,
in which the first end section of the optical communication fiber has a configuration in which the light absorption layer is provided to the end surface of the fiber body.

It should be understood by those skilled in the art that various modifications, combinations, sub-combinations, and alterations may occur depending on design requirements and other factors insofar as they are within the scope of the appended claims or the equivalents thereof.

What is claimed is:

1. An optical communication fiber comprising:
a fiber optic body having a tip surface at an end thereof; and
a light absorption layer provided at the tip surface of the fiber optic body, and configured to reduce light transmittance of communication light, the light absorption layer having a flat surface facing the tip surfaced and a convex surface facing away from the tip surface in an opposite direction.

2. The optical communication fiber according to claim 1, wherein the light absorption layer has a convex lens shape.

3. The optical communication fiber according to claim 1, wherein the light absorption layer has a thickness equal to half or less of a diameter of the fiber optic body.

4. The optical communication fiber according to claim 1, wherein the light absorption layer is formed by coating the tip surface of the fiber optic body with a light absorption material.

5. An optical communication module provided with an optical device and an optical communication fiber having a first end section, the first end section being optically coupled to the optical device, the optical communication fiber comprising:
a fiber optic body having a tip surface at an end thereof; and
a light absorption layer configured to reduce light transmittance of communication light,
wherein,
the first end section of the optical communication fiber has a configuration in which the light absorption layer is provided at the tip surface of the fiber optic body, and the light absorption layer has a flat surface facing the tip surface and a convex surface facing away from the tip surface in an opposite direction.

6. The optical communication module according to claim 5, wherein the optical device and the first end section of the optical communication fiber are coupled to each other by an optical direct coupling system.

7. The optical communication module according to claim 5, wherein the optical device is a device configured to output light.

8. An optical communication system provided with a first optical communication module, a second optical communication module, and an optical communication fiber including a first end section and a second end section, the first end section being optically coupled to the first optical communication module, and the second end section being optically coupled to the second optical communication module, the optical communication fiber comprising:
a fiber optic body having a tip surface at an end thereof; and
a light absorption layer configured to reduce light transmittance of communication light, wherein,
the first end section of the optical communication fiber has a configuration in which the light absorption layer is provided at the end of the fiber optic body, and
the light absorption layer has a flat surface facing the end of the fiber optic body and a convex surface facing away from the end of the fiber body in an opposite direction.

9. The optical communication fiber of claim 1, wherein the light absorption layer comprises carbon.

10. The optical communication fiber of claim 1, wherein the light absorption layer comprises a light-absorbing dye.

11. The optical communication fiber of claim 1, wherein the light absorption layer comprises a resin.

12. The optical communication fiber of claim 1, wherein:
the fiber optic body comprises a core fiber and a cladding, both of which terminate at the end of the fiber optic body; and
the flat surface of the light absorption layer extends over the core fiber and the cladding.

* * * * *